(12) United States Patent
Ben Youcef et al.

(10) Patent No.: US 10,892,521 B2
(45) Date of Patent: Jan. 12, 2021

(54) SOLID POLYMER ELECTROLYTE BASED ON MODIFIED CELLULOSE AND ITS USE IN LITHIUM OR SODIUM SECONDARY BATTERIES

(71) Applicant: Fundacion Centro de Investigacion Cooperativa de Energias Alternativas CIC Energigune Fundazioa, Alava (ES)

(72) Inventors: Hicham Ben Youcef, Alava (ES); Michel Armand, Alava (ES); Brahim Orayech, Alava (ES); Damien Saurel, Alava (ES); Devaraj Shanmukaraj, Alava (ES); Teofilo Rojo, Alava (ES)

(73) Assignee: FUNDACION CENTRO DE INVESTIGACION COOPERATIVA DE ENERGIAS ALTERNATIV AS CIC ENERGIGUNE FUNDAZIOA, Alava (ES)

( * ) Notice: Subject to any disclaimer, the term of this patent is extended or adjusted under 35 U.S.C. 154(b) by 300 days.

(21) Appl. No.: 16/020,568

(22) Filed: Jun. 27, 2018

(65) Prior Publication Data
US 2019/0006711 A1    Jan. 3, 2019

(30) Foreign Application Priority Data
Jun. 28, 2017   (EP) .................................... 17382403

(51) Int. Cl.
| | |
|---|---|
| H01M 10/0565 | (2010.01) |
| H01M 10/0525 | (2010.01) |
| C08B 15/06 | (2006.01) |
| H01M 10/054 | (2010.01) |
| H01M 2/16 | (2006.01) |

(52) U.S. Cl.
CPC .......... *H01M 10/0565* (2013.01); *C08B 15/06* (2013.01); *H01M 2/1626* (2013.01); *H01M 10/054* (2013.01); *H01M 10/0525* (2013.01); *H01M 2300/0082* (2013.01)

(58) Field of Classification Search
CPC ............................................... H01M 10/0565
See application file for complete search history.

(56) References Cited

U.S. PATENT DOCUMENTS

| | | | | |
|---|---|---|---|---|
| 4,374,232 | A * | 2/1983 | Davis .................... | C08F 291/00 525/243 |
| 5,424,150 | A * | 6/1995 | Ohnishi ............. | C08G 65/2609 252/182.1 |
| 2005/0231894 | A1 | 10/2005 | Yoshida et al. | |
| 2013/0189589 | A1 | 7/2013 | Hashaikeh et al. | |
| 2017/0358818 | A1 * | 12/2017 | Nakamura ............ | H01M 4/628 |
| 2018/0131041 | A1 * | 5/2018 | Cotton .............. | H01M 10/0525 |

FOREIGN PATENT DOCUMENTS

JP        2010218742 A        9/2010

OTHER PUBLICATIONS

Paracha, Rizwan N. et al. "Grafting of Liamps on Ethyl Cellulose: A Route to the Fabrication of Superior Quality Polyelectrolyte Gels for Rechargeable Lithium Ion Batteries". Journal of Materials Science, vol. 47, No. 8, 2012, pp. 3698-3705. doi:10.1007/s10853-011-6218-9. (Year: 2012).*
Regiani, Anelise Maria et al. "Cellulose Derivatives As Solid Electrolyte Matrixes". Macromolecular Symposia, vol. 175, No. 1, 2001, pp. 45-54. Wiley, doi:10.1002/1521-3900(200110)175:1<45::aid-masy45>3.0.co;2-m. (Year: 2001).*
European Search Report dated Aug. 28, 2017 for corresponding European Priority Document 17382403.

* cited by examiner

*Primary Examiner* — Robert S Carrico
(74) *Attorney, Agent, or Firm* — Lucas & Mercanti, LLP

(57) ABSTRACT

The present invention refers to a method for preparing a solid polymer electrolyte based on modified cellulose, the method comprising the steps of: a) lithiation or sodiation of at least a hydroxyl group of each repeating unit of a "cellulose" to obtain Li(cellulose) or Na(cellulose); b) functionalization of the Li(cellulose) or Na(cellulose) obtained in step a), in the presence of an aprotic solvent by reacting it with an organic linker, wherein the organic linker serves to covalently attach at least one organic salt to the "cellulose", and the use of the solid polymer electrolyte in lithium or sodium secondary batteries.

23 Claims, 7 Drawing Sheets

SOLID POLYMER ELECTROLYTE BASED ON MODIFIED CELLULOSE AND ITS USE IN LITHIUM OR SODIUM SECONDARY BATTERIES

CROSS REFERENCE TO RELATED APPLICATION

This Application claims priority of European Patent Application No. 17382403.8 filed on Jun. 28, 2017, which is incorporated herein by reference.

DESCRIPTION

Field of the Invention

The present invention relates to a cellulose derivative covalently grafted with an anion of an organic sodium or lithium salt, suitable as a solid polymer electrolyte and a method to produce them. The present invention also relates to the use of said cellulose derivative as a polymer electrolyte for lithium and sodium batteries.

Background Art

Recent incidents in unit of Tesla Model S and Boeing 787 Dreamliner airplane, in particular fires in lithium-ion batteries, support the safety policy as a must in rechargeable lithium batteries (*J. Am. Chem. Soc.*, 2014, Vol. 136, pages 7395-7402; *Electrochimica Acta*, 2013, Vol. 102, pages 133 to 141; *J. Power Sources*, 1997, Vol. 68, page 75, Process Safety and Environmental Protection 2011, Vol. 89, page 434; *Energy and Environmental Science*, 2012, Vol. 5, page 5271). The Solid Polymer Electrolyte (SPE) is regarded as one of the viable solutions for the safety issue in applications of high power rechargeable lithium/sodium batteries, especially electric transportation. SPE possesses several advantages when compared to the liquid electrolytes such as non-volatility, low flammability, easy processability, and electrochemical and chemical stability. Moreover, SPE can eliminate the need for extensive sealing in batteries production and reduce final cost.

The need of safe and commercially viable SPEs induced a tremendous development of new materials, hybrid and composite electrolytes. Ionic transport and mechanical integrity are the main requirements to be fulfilled by SPEs in lithium/sodium batteries. In addition, the need of SPEs with good mechanical properties and especially high modulus is a key to avoid the growth of lithium dendrites and all related safety issues (e.g., short circuit of a lithium battery).

Generally SPEs are prepared by dissolving a lithium/sodium-based salt into a polymer matrix. Among conventional studied polymer matrixes, the poly(ethylene oxide) (PEO) based materials are the most used. In fact, the PEO based materials are well known to solvate lithium/sodium salts. The high molecular weight PEO is a semi-crystalline polymer allowing the $Li^+$ transport by hopping mechanism mainly in the amorphous region (*Polymer*, 2014, Vol. 55, pages 2799-2808). Practical ionic conductivities are achieved using PEO based polymer in combination with various lithium/sodium salts at temperatures above 60° C. Thus, mechanical resistance and dimensional stability are extremely important factors to consider.

A considerable number of lithium salts has been developed for their use in batteries, among them the LiTFSI salt is one of the most studied and used, due to to its highly delocalized charge distribution (i.e. good dissociation/solubility in combination with PEO), thermal, chemical and electrochemical stability. However, the use of such salts in the SPEs is accompanied with a concentration polarization during battery operation, thus increasing the electrolyte resistivity resulting in lower power capability. Furthermore, these type of salts in combination with PEO typically present lower transference number values ($t^+<0.3$) (*Electrochimica Acta*, 2014, Vol. 133, pages 529).

To tackle the ambipolar conductivity problem (i.e. one third of the current is carried by the cation and two thirds by the anion), several studies were focused on anchoring the anions to restrain their mobility and allow only for the cation transport. In fact, the immobilization of the anion is assumed to prevent issues related to the accumulation/depletion of salt in the electrodes, which induces lower power capability and formation of dendrites when in contact with a lithium metal electrode.

There is a clear need to tackle the discussed limitations in lithium/sodium battery electrolytes.

The state of the art describes unsubstituted cellulosic membranes reported as a good separator in batteries and very few studies were devoted to the use of cellulose in general for solid polymer electrolytes.

Recently investigation was more focused on the development of sodium-ion secondary batteries especially for the large-scale electricity grid storage and other non-portable applications. The popularity of the sodium in such applications is based on its natural abundance compared to lithium. The use of solid polymer electrolyte concept in sodium batteries is in a very early stage of development. The major pre-requisites for true solid polymer electrolyte are: the practical ionic conductivity, mechanical integrity, thermal stability, dimensional stability, good compatibility with electrodes and high $Na^+$ transference number.

So far most of developed concepts for SPE's dedicated to sodium ion batteries are based on the combination of sodium salts (e.g., Sodium perchlorate, $NaCF_3SO_3$) and PEO as matrix (*Electrochimica Acta*, 2015, Vol. 175, page 124). Among the studied systems, sodium bis(trifluoromethanesulfonylimide) (NaTFSI) and sodium bis(fluorosulfonyl) imide (NaFSI) are the most interesting and studied ones. On the way of mimicking the lithium SPEs concepts, the introduction of ceramic nano-fillers into sodium based SPEs was performed (*Journal of Power Sources*, 2015, Vol. 278, pages 375) and improvement in ionic conductivities were reported.

The use of cellulose based hybrid solid polymer electrolyte for sodium-ion batteries was reported recently with sodium carboxymethyl cellulose (Na—CMC) as a mechanical reinforcement. However, the —COO$^-$ forms tight ion pairs with the corresponding $Na^+$ and there is no contribution of the CMC to conductivity as the composite does not comprise a dissolved sodium salt to have charge carriers. In fact, a low transference number of 0.15 was measured for such SPE using sodium perchlorate salt as additive at 60° C.

BRIEF DESCRIPTION OF THE INVENTION

The present invention tackles the previously mentioned limitations in lithium/sodium battery electrolytes by providing polymer blend materials, used as membranes formed from such materials, and used in devices such as electrochemical devices incorporating such materials. In other words, the present invention deals with the functionalization of cellulose with covalently attached anionic organic sodium or lithium salt to prepare self-standing single ion conducting polymer electrolyte membranes for all solid state batteries.

The inventors have surprisingly found a single ion conductor polymer electrolyte, and a method to produce it, having practical conductivity and good mechanical properties for lithium/sodium based batteries.

DETAILED DESCRIPTION OF THE INVENTION

Figure 1:
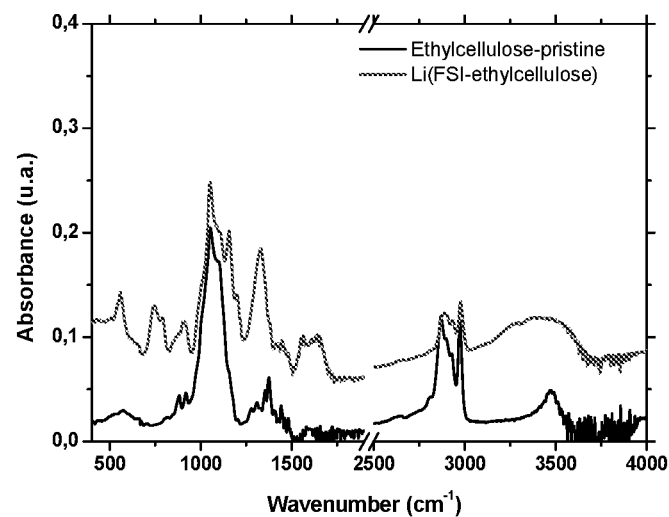
FIG. 1 shows the FTIR spectrum of pure ethyl cellulose and Li(FSI-ethyl cellulose).

The term 'cellulose' as used herein refers to any natural or processed cellulose. Accordingly, the term 'cellulose' comprises, without limitation ethylcellulose, methylcellulose, hydroxyethyl cellulose, and cellulose derivatives, as well as combinations thereof.

The term "modified cellulose" as used herein refers to the "cellulose" resulting from the method as defined in claim 1 or any of the dependent claims. In particular embodiments the solid polymer electrolyte is modified Li(FSI-cellulose) or NA (FSI-cellulose).

The term "organic salt" or "anionic salt" are used indistinctly and refer to an organic salt, more specifically to fluoro sulfonyl isocyanate (—CON(—)SO$_2$F (fluorosulfonyl isocyanate), and the resulting lithium salt Li [—CONSO$_2$F] or Na salt.

The present invention relates to a method for preparing a solid polymer electrolyte based on modified cellulose the method comprising the steps of:

a) lithiation or sodiation of at least a hydroxyl group of each repeating unit of a 'cellulose' to obtain Li(cellulose) or Na(cellulose).

b) functionalization of the Li(cellulose) or Na(cellulose) obtained in step a), in the presence of an aprotic solvent by reacting the Li(cellulose) or Na(cellulose) with an organic linker wherein the organic linker serves to covalently attach at least one organic salt to the "cellulose".

The "modified cellulose" is obtained by reacting an organic linker with the Li(cellulose) or Na(cellulose) obtained in step a), in the presence of an aprotic solvent.

The organic linker may be selected from the group consisting of the fluorosulfonyl isocyanate of formula

(II)

trifluoromethanesulfonyl isocyanate, toluenesulfonyl isocyanate, 4-benzenesulfonyl isocyanate, and the fluorinated forms on the aromatic ring of benzenesulfonyl isocyanate and toluenesulfonyl isocyanate.

In a particular embodiment the organic linker can be obtained from a commercially available chlorosulfonyl isocyanate of formula (III) below:

(III)

that can be used as precursor which is made to react with sodium fluoride for obtaining the fluorosulfonyl isocyanate of formula (II).

According to this particular embodiment the ratio chlorosulfonyl isocyanate to sodium fluoride is in the range of 1/2 to 1/1.

According to this embodiment the final product ratio of fluorosulfonyl isocyanate group/hydroxyl group in each repeating unit is in the range of 1/5 to 1/1.

The aprotic solvent in the method of the invention may be, for example, acetonitrile, DMSO or DMF.

According to additional particular embodiments, step b) is carried out at a temperature ranging from room temperature to 70° C., both included.

The "cellulose" can be natural or processed cellulose. According to additional particular embodiments, the "cellulose" can also be ethylcellulose, methylcellulose or hydroxyethyl cellulose. According to preferred embodiments the "cellulose" is ethyl cellulose.

According to particular embodiments, in the method of the invention the solid polymer electrolyte comprises "modified cellulose" of formula (I), selected between modified Li(FSI-ethylcellulose) or cellulose-NaFSI having a formula (I):

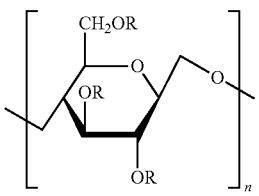

wherein:
R is chosen amongst X, Y or Z, being
X=H,
Y=$C_2H_5$, $CH_3$, $CH_2CH_2OH$, not simultaneously
Z=$CON^-(M^+)SO_2F$
in the respective proportion: x, y and z so that x+y+z=1, M=Li or Na; x, y, z≥0; and 10≤n≤100000.

The solid polymer electrolyte obtained by the method defined above can be modified Li(FSI-ethylcellulose) or cellulose-NaFSI having a formula (I):

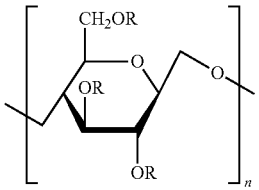

wherein:
R is chosen amongst X, Y or Z, being
X=H,
Y=$C_2H_5$, or $CH_3$, or $CH_2CH_2OH$, not simultaneously
Z=$CON^-(M^+)SO_2F$
in the respective proportion: x, y and z so that x+y+z=1, M=Li or Na; x, y, z≥0; and 10≤n≤100000-. In a preferred embodiment 0.2≤y≤0.6 and 10≤n≤10000.

In the explanation of the formula above, "not simultaneously" means that:
when Y=$C_2H_5$, it refers to ethylcellulose,
when Y=$CH_3$, it refers to methylcellulose,
when Y= or $CH_2CH_2OH$ it refers to hydroxyethylcellulose.

In further embodiments, the "modified cellulose" obtained in step b) is also functionalized, or further grafted, with at least an organic polymer, the grafting of this organic polymer to the "modified cellulose" is performed via covalent bond.

According to this variant, the remaining hydroxyl groups of the "modified cellulose" are further grafted with at least one organic polymer obtaining a "grafted cellulose product" by:
activation of hydroxyl groups of the "modified cellulose" and
grafting of the activated hydroxyl groups of the previous step with an organic polymer.

The organic polymer can be, for example, polyether, polyester, polyamide, polysiloxane, polysulfide, polysulfonate, polysulfonamide, poly(thio)ester or polyamines.

According to particular embodiments the organic polymer is selected among polyethylene glycol (PEG), polyethylene glycol dimethyl ether (PEGDME), polyethylene oxide diacrylate (PEGDA) and poly(ethylene glycol) methyl ether (PEGME), poly(propylene oxide), poly(acrylonitrile-, poly methyl methacrylate and poly vinyldene fluoride.

The same methodology and functional group used to attach the organic salt to the "cellulose" can be used to attach the organic polymer to the "modified cellulose" after step b) of the method of the invention. The remaining hydroxyl groups in the modified cellulose can be activated—before grafting—by groups such as tosyl ($CH_3C_6H_4SO_2$) or amines following which the polymer chains with active end-groups like PEG or PEGDME can be grafted to the activated hydroxyl groups.

In an alternative embodiment, the method of the invention comprises—depending on the degree of modification of the cellulose with an organic salt, to co-graft the solid electrolyte polymer—in particular the modified cellulose—with at least one organic polymer to improve the ionic conductivity. By this co-grafting step the hydroxyl groups of the modified cellulose (obtained in step b)) are further grafted with at least one organic polymer. This organic polymer can have reactive end groups such as carbonyl chloride. According to particular embodiments, the organic polymer may be polyether, polyester, polyamide, polysiloxane, polysulfide, polysulfonate, polysulfonamide, poly(thio ester) or polyamines. In a preferred embodiment the organic polymer is selected from the group consisting of polyethylene glycol dimethyl ether (PEGDME), polyethylene oxide diacrylate (PEGDA) and poly(ethylene glycol) methyl ether (PEGME), poly(propylene oxide), poly(acrylonitrile), poly methyl methacrylate and poly vinyldene fluoride.

The organic polymer can be used as a polymer matrix/binder. "Binder" is understood as any agent to bind the particles together that can be used for electrodes; and "matrix" is understood as any agent that serves as a base for the polymer electrolyte.

The organic polymer may be optionally combined with a plasticizing agent. The term "plasticizing agent" and "plasticizer" are used indistinctively in the present invention to refer to additives that increase the plasticity or viscosity of a material. Among the plasticizing agents are, without limitation succinonitrile (SCN), glutaronitrile (GN), ethylene carbonate, propylene carbonate, etc. Preferably, the plasticizer is added in amounts ranging from 1 to 75 weight % with respect to the weight of the cellulose.

In an alternative embodiment of the method of the invention, the solid polymer electrolyte obtained after step b), —for example, the modified Na(FSI-cellulose) or Li(FSI-cellulose)-, is dissolved in a solvent to form a first mixture. The solvent is well known by the skilled person, and can be, without limitation, methanol, ethanol, acetonitrile and water. The first mixture is then combined with a solution of an organic polymer such as, polyethylene oxide and then casted into a mold, such as for example, a polytetrafluoroethylene (PTFE) dish. Other organic polymers include copolymers of ethylene oxide (EO) and propylene oxide (block or random), poly(methoxy poly [ethylene glycol] acrylate or poly (methoxy poly [ethylene glycol] methacrylate. The dry final polymer electrolyte itself consists according to particular embodiments, of from about 10 to about 50% by weight of modified Na(FSI-ethylcellulose) or Li(FSI-ethylcellulose); and from about 50 to about 90% by weight of the organic polymer.

The present invention also relates to a dry polymer electrolyte itself consisting of from about 10 to about 50% by weight of modified Na(FSI-ethylcellulose) or Li(FSI-ethylcellulose); and from about 50 to about 90% by weight of the organic polymer, obtained by the alternative embodiment of the method of the invention described hereinabove.

If desired, the final dry polymer electrolyte can be hot-pressed, rolled or extruded to adjust the final and practical thickness for battery application.

In a particular embodiment, inorganic nano-particles consisting of a metal oxide, a metal and a metal salt can be added to the matrix. Examples of metal oxides without limitation include $SiO_2$, $MgO$, $TiO_2$, $ZrO_2$, $Al_2O_3$ and $ZnO$. Examples of metal and metal salts include, without limitation, $LiClO_4$, $LiTFSI$, $LiFSI$, $LiBF_4$, $LiPF_6$ and $LiN_3$, either pure or in mixture.

The 'cellulose' grafted with the anionic salt (Na(FSI-cellulose) or Li(FSI-cellulose)) and the organic polymer that has been grafted may be used as self-standing polymer electrolyte without necessity of additional polymer based matrix.

In an alternative embodiment, the modification of cellulose could be started by the reaction of the pristine cellulose with lithium (Formula (IV)) or sodium (Formula (V)) base in first step—step a) in claim 1—. In a second step—step b) of claim 1—the lithiated/sodiated cellulose is then grafted with the organic linker.

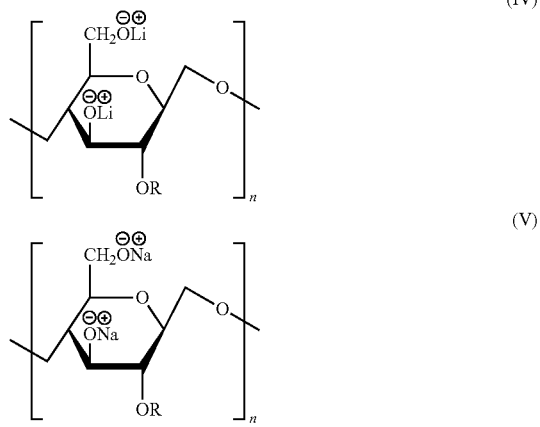

wherein R is chosen amongst $C_2H_5$, $CH_3$, $CH_2CH_2OH$, $(CH_2CH_2O)_xH$.

The present invention also relates to a "modified cellulose", that comprise a delocalized anion covalently attached to at least part of the hydroxyl groups through an organic linker, this organic linker being as defined above, and is based on a lithium or sodium salt. In a particular embodiment, all or part of the hydroxyl groups of the cellulose can be modified with the organic linker.

The present invention relates to a cellulose obtained by the method of claim 1, to which a delocalized anion is covalently attached to the hydroxyl groups of the cellulose through an organic linker and is based on a lithium or sodium salt. In a particular embodiment, all or part of the hydroxyl groups of the cellulose can be modified with the organic linker.

In an alternative embodiment, depending on the degree of modification of the cellulose with an anionic salt (Na(FSI-cellulose) or Li(FSI-cellulose)), according to the variants of the method defined above, is additionally co-grafted with at least one organic polymer to improve the ionic conductivity. In another embodiment, the organic polymer has reactive end groups such as carbonyl chloride. The organic polymer may be polyether, polyester, polyamide, polysiloxane, polysulfide, polysulfonate, polysulfonamide, poly(thio ester) or polyamines. In a preferred embodiment the organic polymer is selected from the group consisting of polyethylene glycol dimethyl ether (PEGDME), polyethylene oxide diacrylate (PEGDA) and poly(ethylene glycol) methyl ether (PEGME), poly(propylene oxide), poly(acrylonitrile-, poly methyl methacrylate and poly vinylydene fluoride.

The invention also relates to a solid polymer electrolyte based on "modified cellulose", that comprises a delocalized anion covalently attached to at least part of the hydroxyl groups of the cellulose through an organic linker. Preferably, the organic linker is selected from the group consisting of the fluorosulfonyl isocyanate of formula

trifluoromethanesulfonyl isocyanate, toluenesulfonyl isocyanate, 4-benzenesulfonyl isocyanate, and the fluorinated forms on the aromatic ring of benzenesulfonyl isocyanate and toluenesulfonyl isocyanate.

According to particular embodiments of the solid polymer electrolyte, the "modified cellulose" is co-grafted with at least one organic polymer by further grafting the hydroxyl groups of the "modified cellulose"—obtained in step b)—defined in claim 1 with at least one organic polymer that has reactive end groups.

The solid polymer electrolyte of the invention, more particularly, the "modified cellulose" obtained by the method of the invention, may have any composition resulting from any of the variants or embodiments or the method as defined hereinabove. For example depending on the organic polymer used, the "modified cellulose" may further comprise:

a polymer matrix, or a polymer binder or a plasticizer or a polymer matrix and a plasticizer a polymer binder and a plasticizer.

The "modified cellulose" of any of the embodiments of the present invention described above can be used as an electrolyte and/or as a binder for rechargeable lithium and sodium batteries. Alternatively, the "modified cellulose" of any of the embodiments of the present invention could also be used as separator. The invention also relates to a lithium or sodium rechargeable battery comprising three layers, a lithium or sodium anode, an electrolyte as described above and a cathode as a composite of the positive electrode material, carbon as a conductive aid and a polymeric binder. In a preferred embodiment, the polymeric binder is the same as the electrolyte.

Conductivities of $0.7 \times 10^{-4}$ S·cm$^{-1}$ and $0.8 \times 10^{-4}$ S·cm$^{-1}$ were measured at 80° C. for Li$^+$ and Na$^+$, respectively, for the blends with 35% modified EC. The SPE shows very good results in full cell battery and offers the opportunity of tuning the mechanical and transport properties to enhance the stability of the resulting lithium/sodium based batteries.

The solid polymer electrolyte based on modified cellulose prepared by the method of the invention can be used for lithium or sodium secondary batteries.

EXAMPLES

Example 1. Production of Li(FSI-Ethylcellulose) and Na(FSI-Ethylcellulose) Solid Polymer Electrolytes (SPEs)

Ethylcellulose (48% ethoxyl (w/w)) purchased from Sigma-Aldrich and fluorosulfonyl isocanate from PROVISCO CS Ltd. The ethylcellulose was lithiated using lithium hydroxide in acetonitrile for 16 hrs at room temperature. Then the lithiated ethylcellulose is reacted with fluorosulfonyl isocyanate in acetonitrile for 16 hrs at room temperature to obtain Li(FSI-ethylcellulose) and Na(FSI-ethylcellulose). The degree of modification was measured by ICP and values of 48% and 53% were measured for Li(FSI-ethylcellulose) and Na(FSI-ethylcellulose), respectively. Poly(ethylene oxide) (PEO) and modified ethyl cellulose (EC) bearing covalently attached anion lithium/sodium salt were blended to form PEO/Li(FSI-ethylcellulose) and PEO/Na(FSI-ethylcellulose) SPEs, respectively.

PEO based SPEs were prepared with different compositions, ranging from 25% up to 50% of modified ethyl cellulose. Transference number values of 0.92 and 0.60 for $Li^+$ and $Na^+$, respectively, were determined for blends with 35% modified ethyl cellulose.

Example 2: Confirmation of Chemical Modification of Ethyl Cellulose

Figure 2:
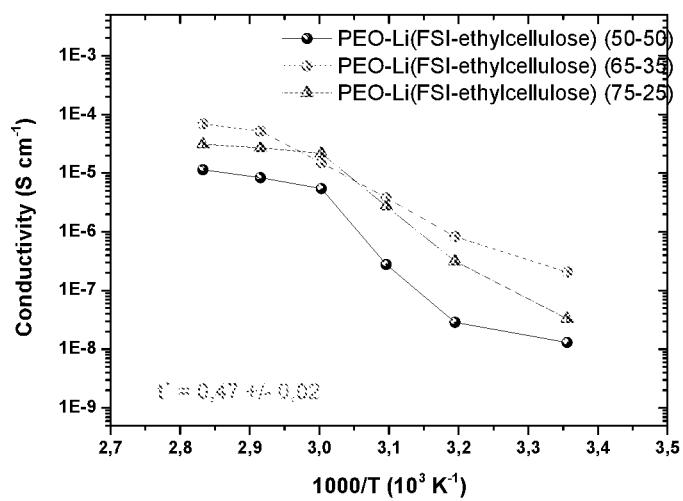
FIG. 2 shows the temperature-dependent ionic conductivity plots for the PEO/Li(FSI-ethylcellulose) based SPEs in various compositions.
Figure 10:
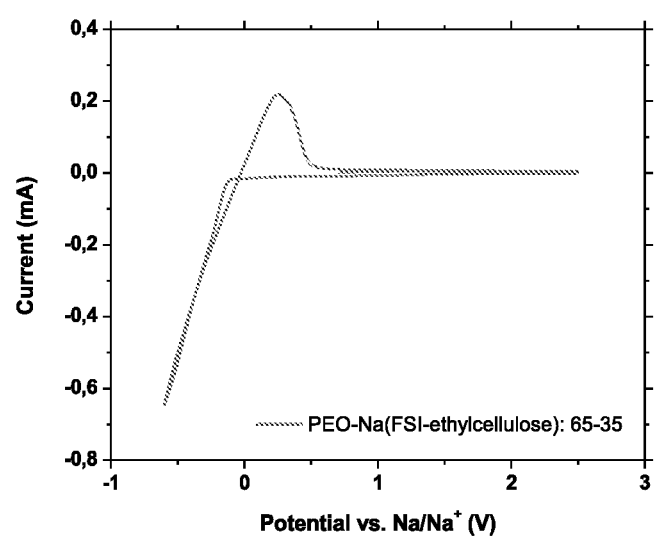
FIG. 10 shows the cyclic voltammogram of polymer electrolyte of PEO/Na(FSI-ethylcellulose)-(SPE) in a SS/SPE/Na cell configuration at 70° C. at a scan rate of 0.5 mV s$^{-1}$.

The FTIR spectra of FIGS. 2 and 10 of Li(FSI-ethylcellulose) and Na(FSI-ethyl cellulose) show new bands at 557 $cm^{-1}$ assigned to the $SO_2$ bending, at 740 $cm^{-1}$ assigned to the S—N stretching, at 792 $cm^{-1}$ assigned to the S—F stretching and at 1153 $cm^{-1}$/1196 $cm^{-1}$ assigned both to the $SO_2$ stretching which indicates that the chemical modification of ethyl cellulose was successfully carried out.

Example 3. Ionic Conductivity and Transport Properties of PEO/Li(FSI-Ethyl Cellulose) and PEO/Na(FSI-Ethyl Cellulose)

Figure 12:
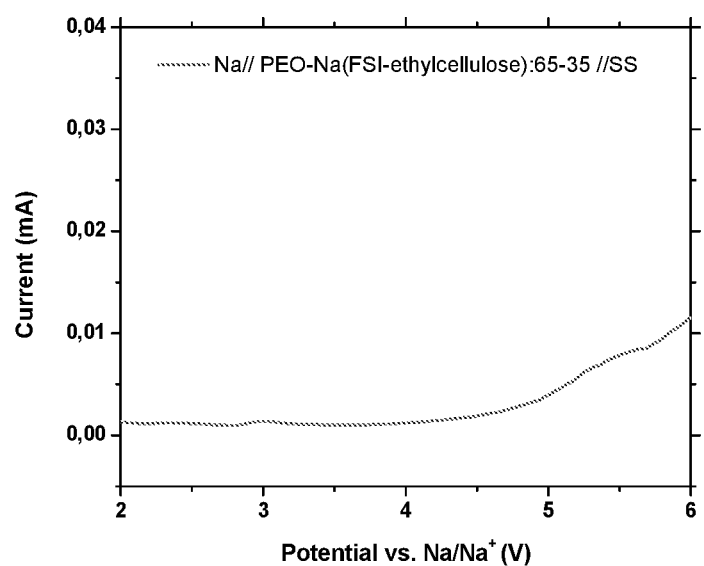
FIG. 12 shows the linear sweep voltammogram of PEO/Na(FSI-ethylcellulose)-(SPE) in a SS/SPE/Na cell configuration obtained at a scan rate of 10 mV s$^{-1}$.

The measured ionic conductivity of the different membranes with varying lithium content at different temperatures is presented in FIGS. 2 and 12. The average number of lithium ions per ethylene oxide units was varied from 8, 15 and 25. The membrane with [EO]/[Li or Na]~15 shows high conductivity values over the measured temperature range. A high Li ion transference number of 0.47 was observed for the membrane with [EO]/[Li]~15 compared to 0.14 of only pure PEO/LiFSI. In the case of PEO/Na(FSI-ethyl cellulose) [EO]/[Li or Na]~15, a high Na-ion transference number of 0.60 was observed.

Example 4: Li and Na Plating/Stripping Properties of PEO/Li or Na(FSI-Ethyl Cellulose)

Figure 3:
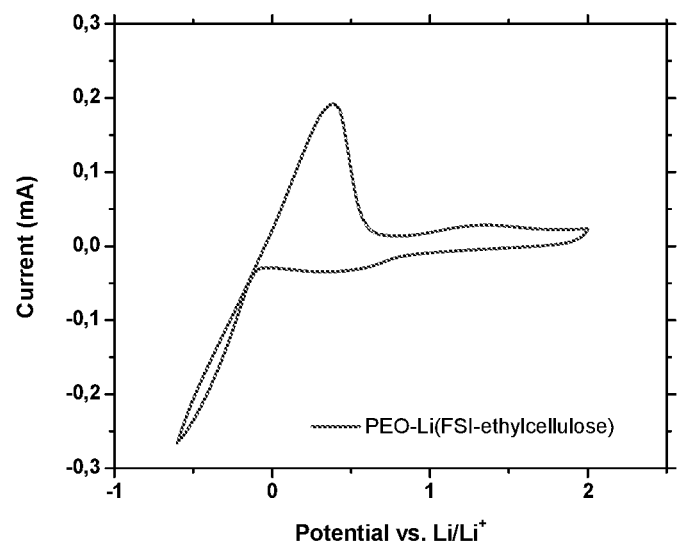
FIG. 3 shows the cyclic Voltammogram of polymer electrolyte of Li—PEO/Li(FSI-ethylcellulose)-SS cell at 70° C., at a scan rate of 10 mV s$^{-1}$.
Figure 4:
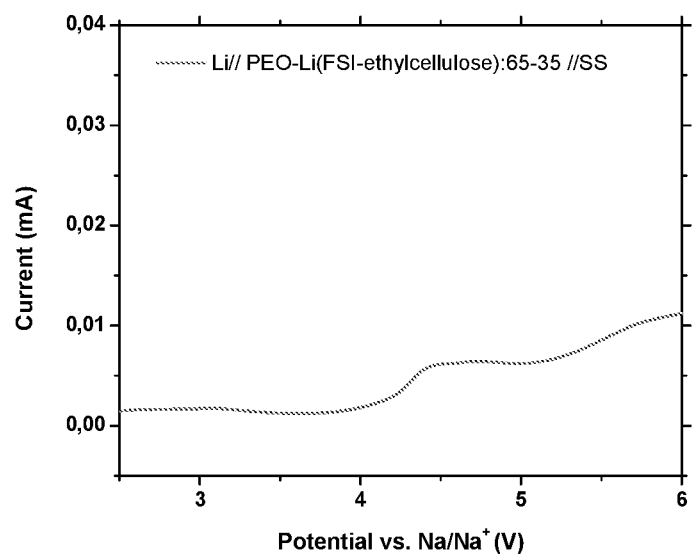
FIG. 4 shows the linear Sweep Voltammogram of Li—PEO/Li(FSI-ethylcellulose) SPE-SS cell at 70° C. obtained at a scan rate of 10 mV s$^{-1}$.
Figure 11:
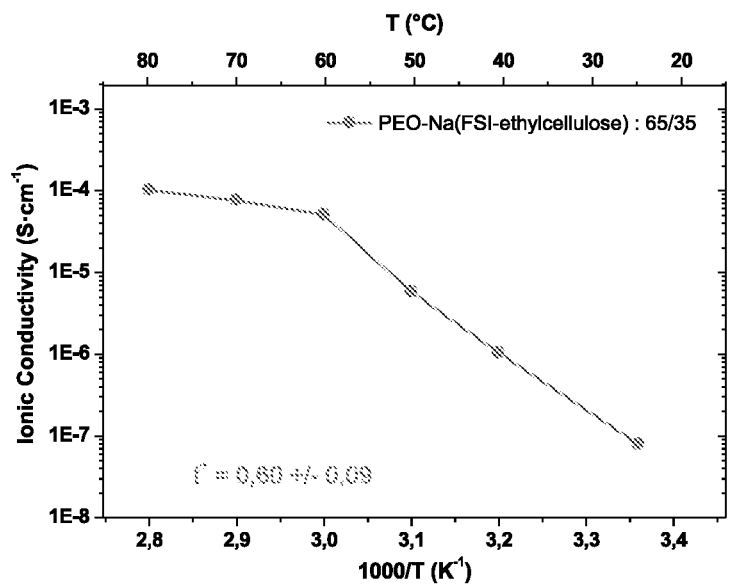
FIG. 11 shows the temperature-dependent ionic conductivity plots for the PEO/Na(FSI-ethylcellulose) based SPE.

CR2032 cells were assembled with Li or Na as anode and stainless steel as cathode. The modified cellulose with PEO was used as a solid polymer electrolyte (SPE) between the cathode and anode. As shown in FIGS. 3 and 11, the cyclic voltammetric studies of Li/SPE/SS cells Na/SPE/SS cells at a scan rate of 10 $mVs^{-1}$ and 0.5 $mV·s^{-1}$ respectively show good Lithium and sodium stripping properties above and below 0V showing the feasibility of these electrolytes for practical applications.

Example 5: Electrochemical Stability of the Solid Polymer Electrolytes

CR2032 cells were assembled with Li or Na as anode and stainless steel as cathode. The modified cellulose with PEO was used as a solid polymer electrolyte (SPE) between the cathode and anode. The linear sweep voltammogram of PEO/Na or Li(FSI-ethylcellulose)-(SPE) in a SS/SPE/Na or Li cell configuration as shown in FIG. 3 and FIG. 10 shows an electrochemical stability potential of >4.3V at 70° C.

Figure 5:
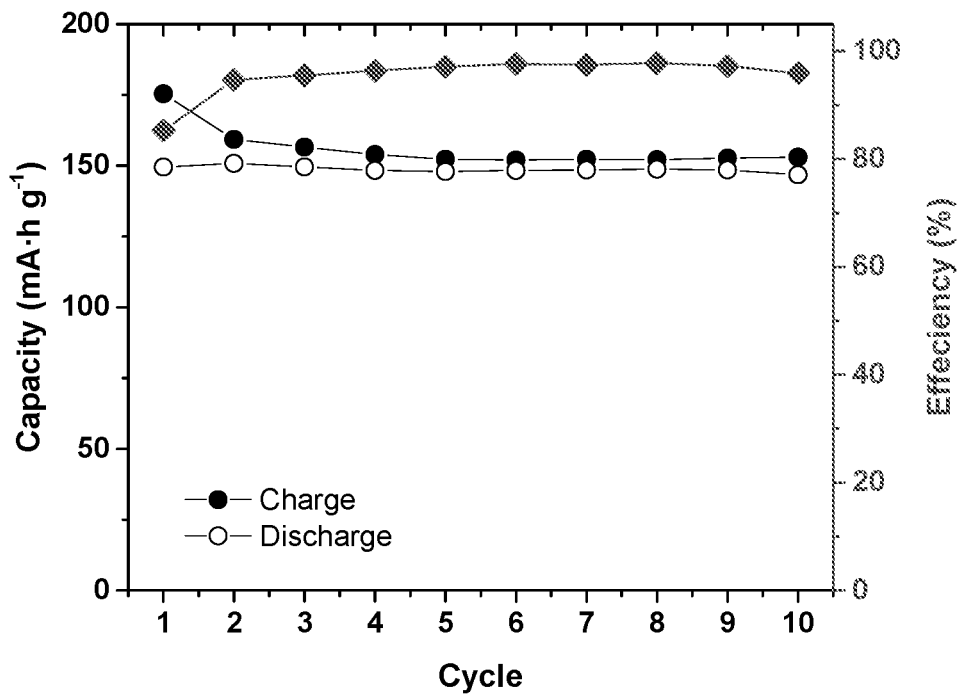
FIG. 5 shows the galvanostatic cycling performance of Li—LiFePO$_4$ cell at a c-rate of C/20 at 70° C.
Figure 6:
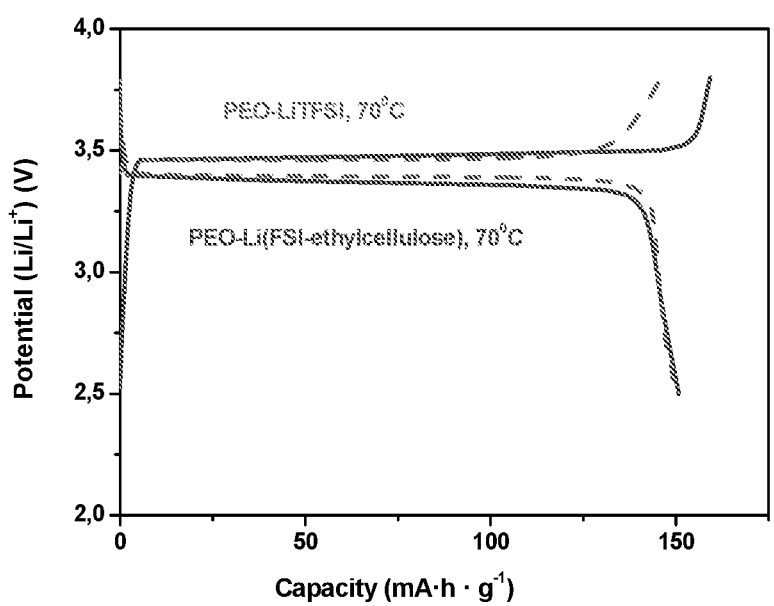
FIG. 6 shows first charge-discharge curves of cells assembled with conventional PEO/LiTFSI electrolyte and PEO—Li(FSI-ethylcellulose) electrolytes using LiFePO$_4$ cathode material at 70° C.

Example 6: Cycling Behaviour of Li/LiFePO$_4$ and Na/Hard Carbon Solid State Cells Cells were assembled with lithium foil as anode. Cathode was prepared using 65% of $LiFePO_4$, 5% of Carbon black (Csp, Imerys), 9% Li(FSI-ethylcellulose) and 21% of PEO as binder. PEO Li(FSI-ethylcellulose) was used as an electrolyte and cycled at a c-rate of C/20 between a voltage range of 2.5V-3.7V The galvanostatic cycling performance of Li—$LiFePO_4$ cell (FIG. 5) at a c-rate of C/20 at 70° C. is shown to exhibit a maximum discharge capacity of 150 mAh/g. The charge/discharge profiles (FIG. 6) shows the comparison of first charge-discharge curves of cells assembled with conventional PEO/LiTFSI electrolyte and PEO—Li(FSI-ethylcellulose) electrolytes. Similar voltage profiles were obtained when compared to conventional PEO/LiTFSI electrolytes.

Figure 13:
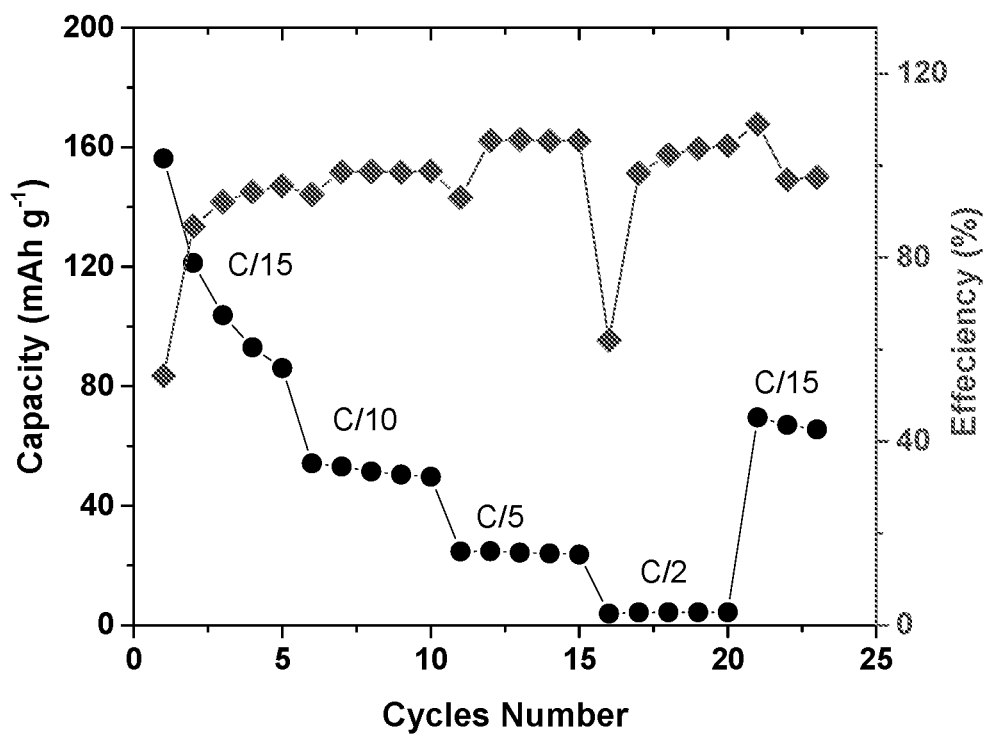
FIG. 13 shows the galvanostatic cycling performance of Na-Hard Carbon cell with PEO/Na(FSI-ethylcellulose) as electrolyte at different c-rates (C/15, C/10, C/5 and C/2) at 70° C.

FIG. 13 shows the galvanostatic cycling performance of Na-Hard Carbon cell with PEO/Na(FSI-ethylcellulose) as electrolyte carried out at different c-rates (C/15, C/10, C/5 and C/2) and cycled at 70° C. The electrode/electrolyte configuration was as follows; Cathode: Hard Carbon/Carbon Black (Csp); Anode: Sodium metal. The results show good capacity recoverability at C/15 even after cycling at a high c rate of C/2.

Example 7: Cycling Properties Use SPE in Li/S Cells

Figure 7:
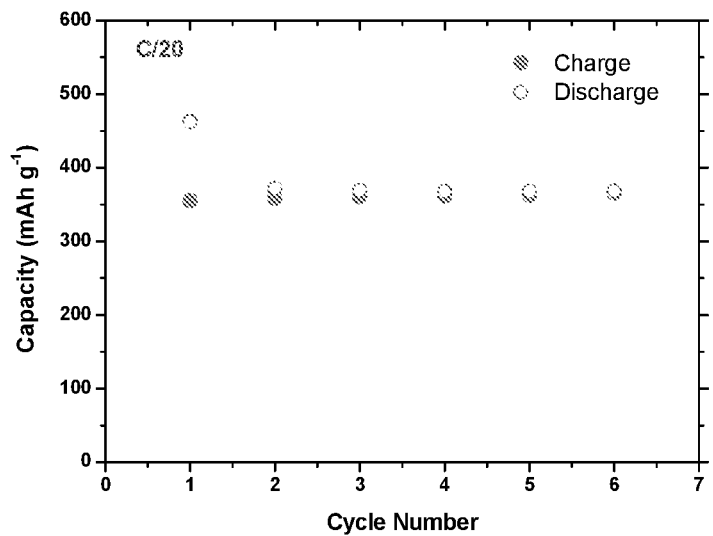
FIG. 7 shows the galvanostatic cycling performance of the Li—FSI-ethylcellulose cell in a Li/S battery system at a c-rate of C/20, at 70° C.
Figure 8:
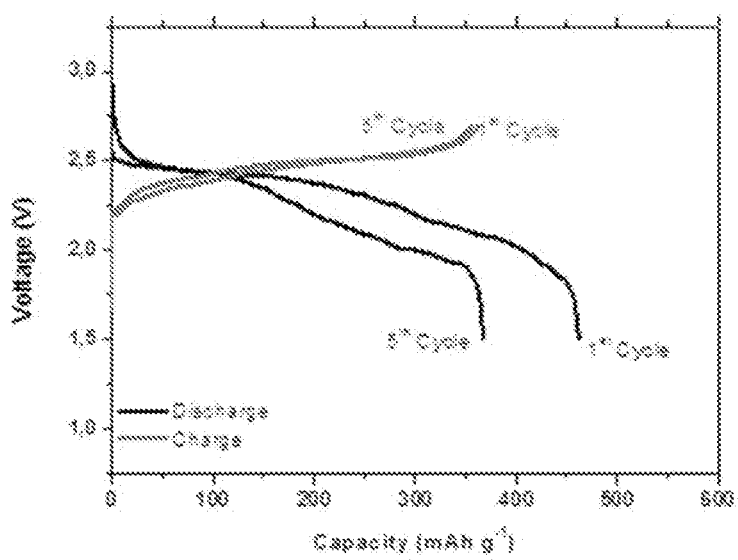
FIG. 8 shows charge-discharge profiles of Li/S cells using PEO/Li(FSI-ethylcellulose) solid polymer electrolyte at 70° C.
Figure 9:
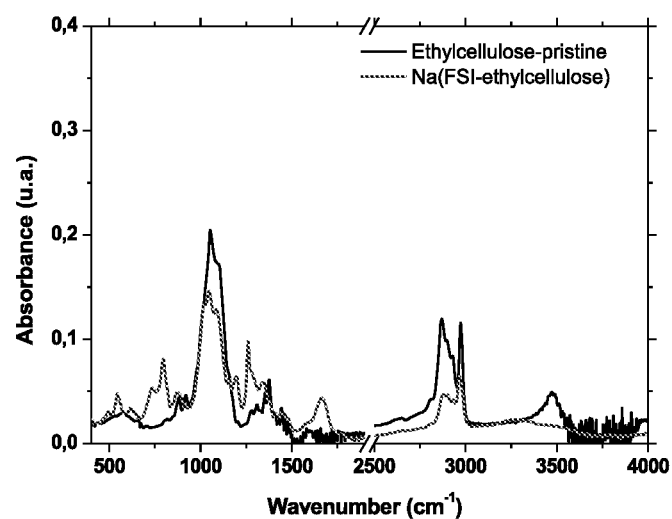
FIG. 9 shows the FTIR spectrum of pure ethylcellulose and Na(FSI-ethylcellulose).

FIG. 7 shows the galvanostatic cycling performance of the Li—FSI-ethylcellulose cell in a Li/S battery system at a c-rate of C/20, and at temperature of 70° C. Cells were assembled with lithium foil as anode and the cathode was prepared using 35% of sulphur, 15% of Ketjen black (Ckj-600, AkzoNobel), 15% Li(FSI-ethylcellulose) and 35% of PEO as binder. Sulphur was dry ball milled in an 8000M mixer/mill (© SPEX SamplePrep) for min with carbon black prior to the cathode slurry preparation. The PEO was dissolved in acetonitrile, while the Li(FSI-ethylcellulose) was dissolved in ethanol and was added and the resulting mixture was wet ball milled for 30 min at RT. Initial cycles showed a discharge capacity of approximately 350 mAh/g at a C-rate of C/20. FIG. 8 shows the typical formation of higher and lower order polysulphides during discharge (reduction) followed by the oxidation of lower order polysulphides that takes place in Li/S batteries.

The invention claimed is:

1. A method for preparing a solid polymer electrolyte based on modified cellulose, the method comprising the steps of:
   a) lithiation or sodiation of at least a hydroxyl group of each repeating unit of a cellulose to obtain Li(cellulose) or Na(cellulose);
   b) functionalizing the Li(cellulose) or Na(cellulose) obtained in step a), in the presence of an aprotic solvent by reacting the Li(cellulose) or Na(cellulose) with an organic linker, wherein the organic linker serves to covalently attach at least one organic salt to the cellulose, wherein the organic linker is selected from the group consisting of the fluorosulfonyl isocyanate of formula

trifluoromethanesulfonyl isocyanate, toluenesulfonyl isocyanate, 4-benzenesulfonyl isocyanate, and the fluorinated forms on the aromatic ring of benzenesulfonyl isocyanate and toluenesulfonyl isocyanate.

2. The method according to claim 1, wherein a ratio of the fluorosulfonyl isocyanate/hydroxyl group in each repeating unit is in a range of 1/5 to 1/1.

3. The method according to claim 1, wherein step b) is carried out under an inert atmosphere over a period of at least 16 hours.

4. The method according to claim 1, wherein the aprotic solvent is acetonitrile, DMSO or DMF.

5. The method according to claim 1, wherein step b) is carried out at a temperature ranging from room temperature to 70° C., both included.

6. The method according to claim 1, wherein the cellulose is natural or processed cellulose.

7. The method according to claim 1, wherein the cellulose is ethylcellulose, methylcellulose or hydroxyethyl cellulose.

8. The method according to claim 1, wherein the cellulose is ethyl cellulose.

9. The method according to claim 1, wherein the solid polymer electrolyte comprises modified cellulose of formula (I), selected between modified Li(FSI-ethylcellulose) or cellulose-NaFSI having a formula (I):

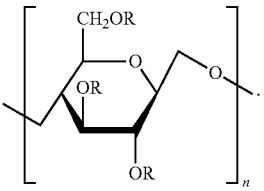

wherein:
R is chosen amongst X, Y or Z, being
X=H,
Y=$C_2H_5$, $CH_3$, $CH_2CH_2OH$, not simultaneously
Z=$CON^-(M^+)SO_2F$
in the respective proportion: x, y and z so that x+y+z=1, M=Li or Na; x, y, z≥0; and 10≤n≤100000.

10. The method according to claim 9, wherein 0.2≤y≤0.6.

11. The method according to claim 1, wherein the remaining hydroxyl groups of the modified cellulose are further grafted with at least one organic polymer obtaining a grafted cellulose product by:
activating hydroxyl groups of the modified cellulose and grafting the activated hydroxyl groups of the previous step with an organic polymer.

12. The method according to claim 11, wherein the organic polymer is selected from polyether, polyester, polyamide, polysiloxane, polysulfide, polysulfonate, polysulfonamide, poly(thio)ester or polyamines.

13. The method according to claim 11 wherein the organic polymer is selected from the group consisting of polyethylene glycol (PEG), polyethylene glycol dimethyl ether (PEGDME), polyethylene oxide diacrylate (PEGDA), poly(ethylene glycol) methyl ether (PEGME), poly(propylene oxide), poly(acrylonitrile), polymethyl methacrylate and polyvinylydene fluoride.

14. The method according to claim 1, wherein the cellulose or modified cellulose has at least an hydroxyl group that is activated by a lithium/sodium base of formula $M^+Y^-$, wherein M is Li or Na; and $Y^-$ is selected from the group consisting of $OH^-$, $CH_3O^-$, $C_2H_5O^-$, $NH_2$, $(iso-propyl)_2N^-$ and $[(CH_3)_3Si]_2N$.

15. The method according to claim 1, wherein the solvent is selected from the group consisting of water, alcohols, amides and mixtures thereof.

16. A solid polymer electrolyte based on modified cellulose obtained by the method of claim 1 comprising a delocalized anion covalently attached to at least part of the hydroxyl groups of the cellulose through an organic linker.

17. The solid polymer electrolyte according to claim 16, wherein the organic linker is selected from the group consisting of the fluorosulfonyl isocyanate of formula

trifluoromethanesulfonyl isocyanate, toluenesulfonyl isocyanate, 4-benzenesulfonyl isocyanate, and the fluorinated forms on the aromatic ring of benzenesulfonyl isocyanate and toluenesulfonyl isocyanate.

18. The solid polymer electrolyte according to claim 17 where the modified cellulose is co-grafted with at least one organic polymer by further grafting the hydroxyl groups of the modified cellulose—obtained in step b) of the method with at least one organic polymer that has reactive end groups.

19. A modified cellulose obtained by the method defined in claim 1.

20. The modified cellulose according to claim 19 further comprising:
a polymer matrix, or
a polymer binder, or
a plasticizer, or
a polymer matrix and a plasticizer, or
a polymer binder and a plasticizer.

21. The modified cellulose according to claim 19, wherein the polymer binder or polymer matrix is poly(ethylene oxide) and the plasticizer is polyethylene glycol dimethylether.

22. A self-standing polymer electrolyte comprising the electrolyte obtained by the method according to claim 1 using a solvent selected from the group consisting of water, alcohols, amides and mixtures thereof.

23. A lithium or sodium battery which comprises the electrolyte prepared by the method defined in claim 1.

* * * * *